United States Patent
Lee et al.

(10) Patent No.: US 9,692,093 B2
(45) Date of Patent: Jun. 27, 2017

(54) REDUCED ORDER BATTERY THERMAL DYNAMICS MODELING FOR CONTROLS

(71) Applicant: Ford Global Technologies, LLC, Dearborn, MI (US)

(72) Inventors: Tae-Kyung Lee, Ann Arbor, MI (US); Xinfan Lin, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 427 days.

(21) Appl. No.: 14/320,722

(22) Filed: Jul. 1, 2014

(65) Prior Publication Data

US 2016/0006087 A1  Jan. 7, 2016

(51) Int. Cl.
| | |
|---|---|
| *H01M 10/44* | (2006.01) |
| *H01M 10/46* | (2006.01) |
| *H01M 10/635* | (2014.01) |
| *B60L 11/18* | (2006.01) |
| *G05B 15/02* | (2006.01) |
| *H01M 10/48* | (2006.01) |
| *H01M 10/625* | (2014.01) |
| *H01M 10/633* | (2014.01) |

(52) U.S. Cl.
CPC ......... *H01M 10/635* (2015.04); *B60L 11/187* (2013.01); *G05B 15/02* (2013.01); *H01M 10/486* (2013.01); *H01M 10/625* (2015.04); *H01M 10/633* (2015.04); *H01M 2220/20* (2013.01)

(58) Field of Classification Search
CPC ........ H02J 7/0091; H02J 7/047; H02J 7/1423; H02J 7/1453
USPC ................................ 320/116, 150, 153, 104
See application file for complete search history.

(56) References Cited

U.S. PATENT DOCUMENTS

| | | | |
|---|---|---|---|
| 6,076,964 A | 6/2000 | Wu et al. | |
| 7,433,794 B1* | 10/2008 | Berdichevsky | ....... B60L 3/0046 320/150 |
| 7,660,694 B2 | 2/2010 | Wu et al. | |
| 2011/0299564 A1 | 12/2011 | Leutheuser et al. | |
| 2012/0109554 A1 | 5/2012 | Lin et al. | |
| 2012/0128026 A1 | 5/2012 | Kenkre et al. | |
| 2014/0266038 A1* | 9/2014 | Gibeau | ............... B60L 11/1875 320/109 |

\* cited by examiner

*Primary Examiner* — Edward Tso
(74) *Attorney, Agent, or Firm* — David Kelley; Brooks Kushman P.C.

(57) ABSTRACT

A vehicle includes a traction battery that is comprised of a number of cells. A controller operates the traction battery according to a temperature for each of the cells. The temperature is based on a number of coefficients representing a contribution of at least one cell boundary thermal condition and a heat generated in the cell to a steady-state temperature at a predetermined location within the cell. The contributions may be filtered to predict a dynamic response of the temperature to changes in the boundary thermal conditions and the heat generated in the cell. The coefficients may be derived from a full-order model. The resulting reduced-order model requires less execution time while achieving accuracy similar to the full-order model. In addition, a range of characteristic temperatures may be obtained for each cell.

17 Claims, 5 Drawing Sheets

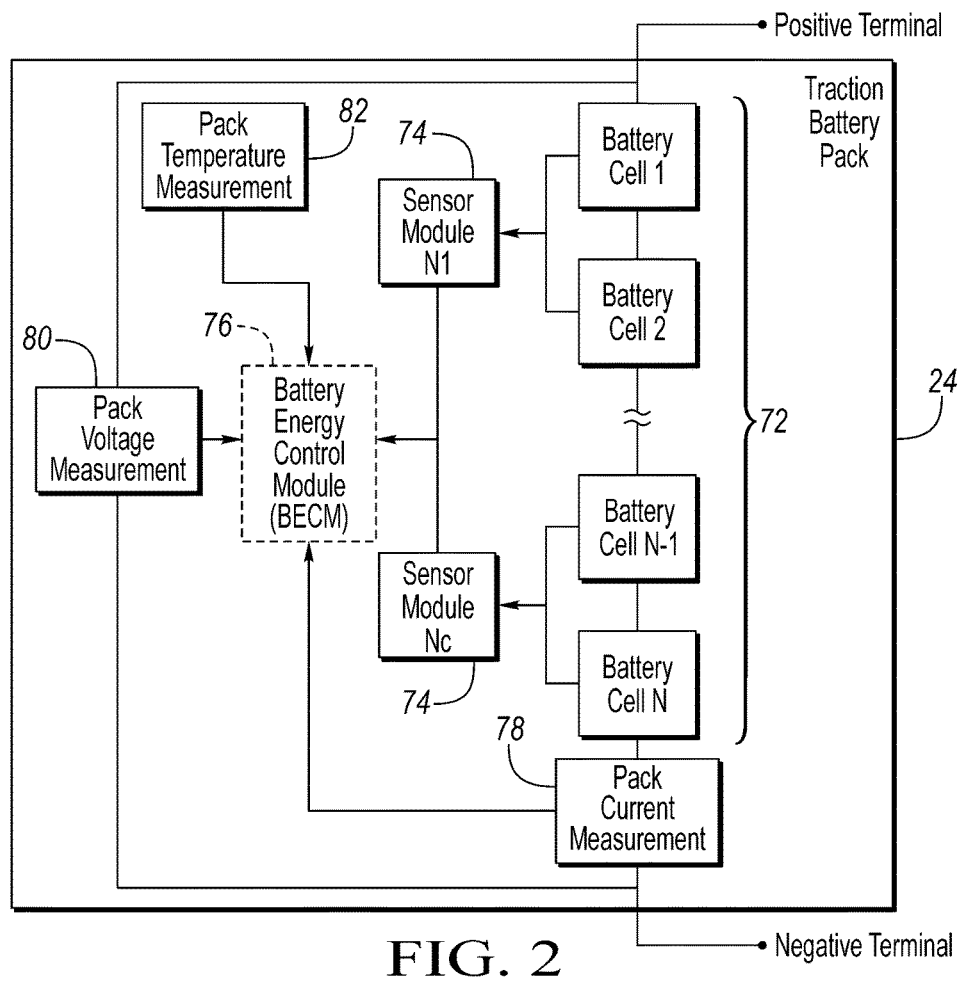
FIG. 2
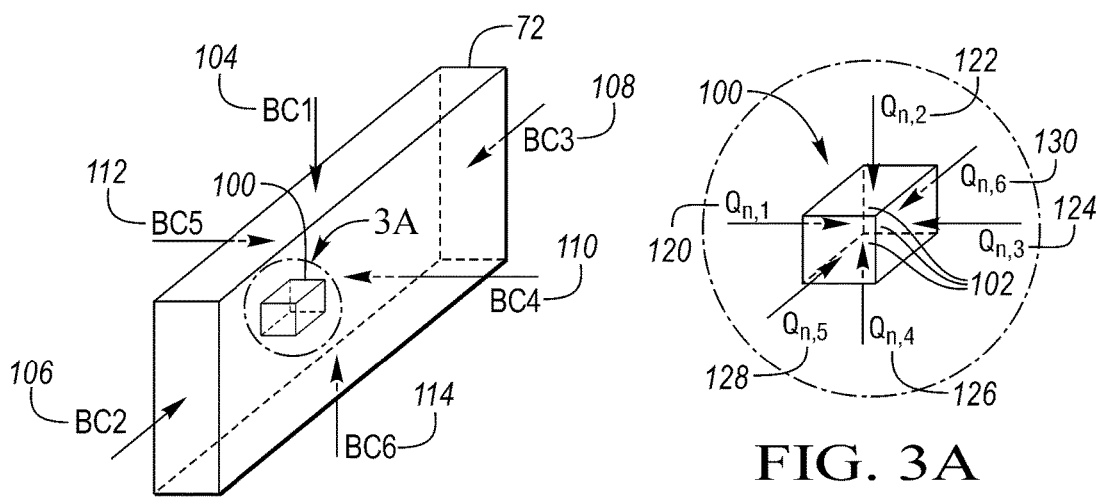
FIG. 3
FIG. 3A

Spatial Distribution of $\alpha_{n,2}$ for Computing the Steady State Temperatures

REDUCED ORDER BATTERY THERMAL DYNAMICS MODELING FOR CONTROLS

TECHNICAL FIELD

This application generally relates to temperature estimation with a vehicle battery.

BACKGROUND

Hybrid and electric vehicles include a traction battery comprised of a number of cells. Traction batteries store energy and provide power to electric machines for propulsion and other functions. Operation of the traction battery may be monitored and the traction battery may be controlled based on a variety of inputs. A battery management system may utilize a temperature sensor mounted to each cell or group of cells to aid in controlling the traction battery. The temperature sensors may provide a reasonable temperature at the mounting surface but may not provide an accurate indication of temperatures within the battery cell.

SUMMARY

A vehicle includes a traction battery comprised of a plurality of cells and at least one controller. The at least one controller is programmed to operate the traction battery according to a temperature for each of the cells that is based on a plurality of coefficients representing a contribution of at least one cell boundary thermal condition and a heat generated in the cell to a steady-state temperature at a predetermined location within the cell. The at least one controller may be further programmed to filter the contribution of the at least one cell boundary thermal condition and the heat generated in the cell to predict a dynamic response to changes in the at least one cell boundary thermal condition and the heat generated in the cell. The at least one controller may be further programmed to filter the contribution of the at least one cell boundary thermal condition with a first time constant to predict a dynamic response to changes in the at least one cell boundary thermal condition and filter the contribution of the heat generated by the cell with a second time constant to predict a dynamic response to changes in the heat generated in the cell. The coefficient associated with the contribution of the heat generated in the cell may be derived from a model in which the cells are represented as a plurality of elements, and the coefficient corresponding to each of the elements may be derived from a system matrix defining interactions between the elements and an input matrix defining influence of the heat generated in the cell. The predetermined location may correspond to the element in which the coefficient associated with the contribution caused by the heat generated in the cell is a maximum. The predetermined location may correspond to the element in which the coefficient associated with the contribution caused by the heat generated in the cell is a minimum. The at least one cell boundary condition may include a measured temperature. The coefficients associated with the contribution of the at least one cell boundary thermal condition may be derived from a model in which the cells are represented as a plurality of elements, and the coefficients corresponding to each of the elements may be derived from a system matrix defining interaction between the nodes and an input matrix defining influence of the at least one cell boundary thermal condition. The coefficients associated with the contribution of the at least one cell boundary thermal condition may be one.

A battery management system includes at least one controller programmed to operate a battery cell according to a cell temperature that is based on a plurality of coefficients representing a contribution of at least one cell boundary condition and a heat generated in the battery cell to a steady-state temperature at a predetermined location within the battery cell. The at least one controller may be further programmed to filter the contribution of the at least one cell boundary condition and the heat generated in the battery cell. The at least one controller may be further programmed to filter the contribution of the at least one cell boundary condition with a first time constant and filter the contribution of the heat generated in the cell with a second time constant. The coefficients may be derived from a system matrix that defines temperature interactions between a plurality of elements that represent the battery cell, a first input matrix defining influence of the at least one cell boundary condition, and a second input matrix defining influence of the heat generated in the battery cell. The coefficient associated with the contribution of heat generated in the battery cell may be a maximum value. The coefficient associated with the contribution of heat generated in the battery cell may be a minimum value.

A method of operating a traction battery comprised of a plurality of cells includes outputting, by a controller, a temperature for each of the cells that is based on a plurality of coefficients representing a contribution of at least one cell boundary condition and a heat generated in the cell to a steady-state temperature of a predetermined location within the cell, and operating the traction battery according to the temperature of the cells. The method may further include filtering, by the controller, the contribution of the at least one cell boundary condition using a filter with a first time constant and the heat generated in the cell using a filter with a second time constant to filter changes in the steady-state temperature. The plurality of coefficients may be derived from a model of the cell as represented by a plurality of elements, and the predetermined location may correspond to a selected one or more of the elements. The predetermined location may correspond to the element in which the coefficient associated with the contribution caused by the heat generated in the cell is a maximum. The predetermined location may correspond to the element in which the coefficient associated with the contribution caused by the heat generated in the cell is a minimum.

BRIEF DESCRIPTION OF THE DRAWINGS

FIG. 2 is a diagram of a possible battery pack arrangement comprised of multiple cells, and monitored and controlled by a Battery Energy Control Module.

FIG. 3 is an illustration of a battery cell and a representative element or node depicting interactions with boundary conditions.

FIG. 3A is an illustration of a representative element or node depicting interactions between elements.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
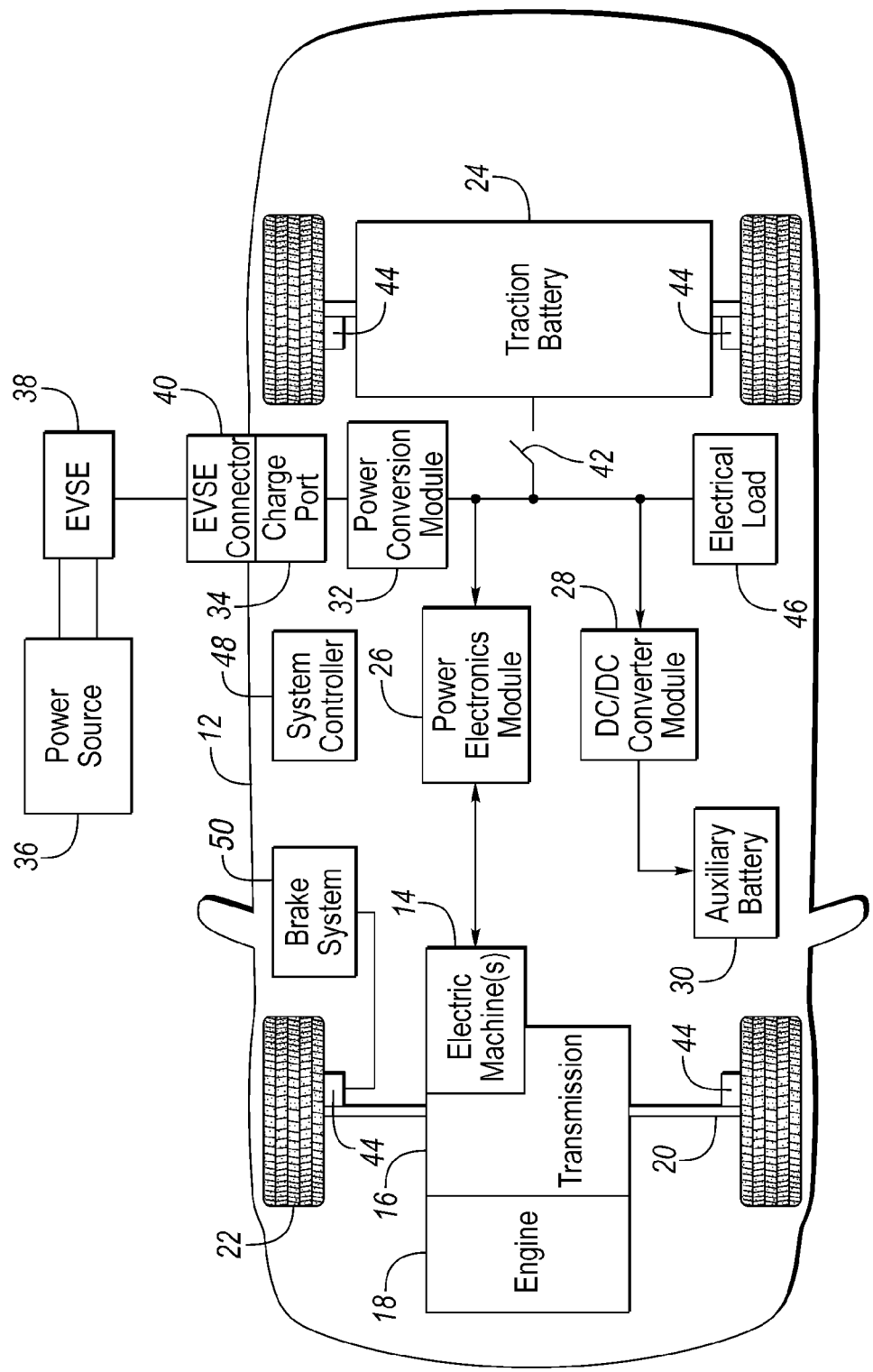
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery system may have a one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The controller 76 may be configured to measure a temperature of one or more battery cells 72. The temperature reported may only be representative of the point at which the temperature sensor is attached to the battery cell 72. Additional temperature information from locations within the battery cell 72 may be desirable. For example, it may be useful to determine a maximum and a minimum temperature within the battery cells 72. Knowing this information may allow improved thermal management of the traction battery 24. In addition, battery cell properties, such as resistance, vary with temperature. Knowledge of the temperature may provide improved estimates of temperature dependent properties leading to improved control of the traction battery 24.

A battery thermal management system may operate by measuring a temperature at one point of the battery cell. The measured temperature may be filtered and processed and used to represent the temperature of the entire cell. An estimation of a single temperature lacks information on the distribution of temperature within the cell. A thermal model of the battery cell may be used to estimate the temperature of other locations within the battery cell.

Modeling of the thermal properties of a battery may be limited by processing resources of the controller 76. A highly complex model may be difficult to execute in real-time and may challenge the available computing resources. The complexity of the model may be attributed in part to the number of states that must be evaluated. Generally, the accuracy and usefulness of the model may depend on calculating a sufficient number of states to achieve the desired quality. Reducing the number of states may affect the accuracy of the model leading to less reliable outputs.

A method of estimating cell temperatures may be comprised of several steps. A temperature distribution across a cell may be computed using a full-order thermal model of the battery cell. Temperatures within a battery may be computed based on a model of the battery system. One possible model may be expressed using a partial differential equation (PDE):

$$\rho c_p \frac{\partial T}{\partial t} = q_{gen} + \kappa_x \frac{\partial^2 T}{\partial x^2} + \kappa_y \frac{\partial^2 T}{\partial y^2} + \kappa_z \frac{\partial^2 T}{\partial z^2} \quad (1)$$

where $\kappa$ is the thermal conductivity, $\rho$ is the density and $c_p$ is the specific heat capacity. The quantity $q_{gen}$ is the heat generated in the battery cell caused by operating the battery cell and may be expressed as:

$$q_{gen} = I\left(V - V_{oc} - T\frac{dU}{dT}\right) \quad (2)$$

The partial differential equation (1) is subject to boundary conditions that may be expressed as:

$$\kappa \frac{\partial T}{\partial x}\bigg|_{BC} = U_{BC}\Delta T_{BC} \text{ or } \kappa \frac{\partial T}{\partial x}\bigg|_{BC} = q_{BC} \quad (3)$$

where $q_{BC}$ is the controlled heat transfer rate per unit area at the boundary. For example, the boundaries of the cell may be perfectly insulated such that $q_{BC}$ equals zero. That is, there is no heat flow into or from the cell at the boundary. In another example, cooling may be provided at a boundary of the cell in which case the boundary condition is a function of the heat transfer coefficient, $U_{BC}$, and the change in temperature across the boundary. The particular formula used at a boundary depends upon the configuration of the cells and cell heating/cooling configuration.

FIG. 3 depicts an example of a prismatic battery cell 72 and FIG. 3A depicts one of a plurality of elements 100 used to represent a temperature at a corresponding location of the cell. A prismatic cell 72 may be divided into a plurality of elements (or nodes) 100 in which there are N elements 100. Each element 100 may represent a small volume or area of the battery cell 72. Each element 100 may have a plurality of surfaces 102 (or sides) in which there are p surfaces 102 (or sides). For example, for a three-dimensional model there may be 6 surfaces 102 for each element 100. A two-dimensional element 100 may have 4 sides. Each element 100 may represent a volume or area within the prismatic cell 72. Each element 100 may be surrounded by one or more adjacent elements.

The temperature of the element may be represented by a node located at the center of the element. A prismatic battery cell 72 may be modeled as a system comprised of a plurality of elements 100. Each element 100 may have associated thermal characteristics (e.g., a temperature, a heat transfer rate). Each element 100 may be defined by a plurality of surfaces 102. For example, a three-dimensional element 100 may be defined by six surfaces 102 (reference label 102 only points to the three visible surfaces shown in FIG. 3). The temperature of a given element 100 may depend upon the temperature of surrounding elements and the amount of heat generated by the prismatic cell 72. Each surface 102 of an element 100 may interact with a surface of an adjacent element and transfer heat to and from the element 100. A surface 102 of the element 100 may interface with a boundary of the prismatic cell 72. At the cell boundaries, the thermal conditions external to the cell 72 may affect the thermal conditions within the cell 72.

Each cell 72 may be affected by one or more cell boundary thermal conditions, BC1 104, BC2 106, BC3 108, BC4 110, BC5 112, and BC6 114. Each boundary condition BC1-BC6 (104-114) may represent a thermal condition at the cell boundary. The thermal condition may include a temperature relationship. For example, the thermal condition may be a difference between the temperature of the cell boundary surface and a temperature of the body that contacts the cell boundary surface. An example may be a cooling plate that contacts the cell surface to provide cooling for the battery cell 72. The thermal condition may be a heat transfer to or from the surface of the battery cell 72. When the cell boundary is perfectly insulated, there is no heat transfer at the boundary.

The temperature of each element 100 may be influenced by surrounding elements. A heat transfer between surfaces 102 of the element 100 and the surfaces of adjacent elements may affect the temperature of the element 100. The heat transfer between each surface 102 may be defined as $Q_{n,p}$, where n is the element number and p is a surface number. FIG. 3A depicts a heat transfer affecting each surface as $Q_{n,1}$ 120, $Q_{n,2}$ 122, $Q_{n,3}$ 124, $Q_{n,4}$ 126, $Q_{n,5}$ 128, and $Q_{n,6}$ 130.

For each node, equation (1) may be re-written in discrete form as follows:

$$T_n(k+1) = T_n(k) + \Delta T_n(k) \tag{4}$$

where $$\Delta T_n(k) = \frac{\Delta t}{mc_p}(Q_{gen}(k) + \Sigma Q_{n,p}(k)), \text{ and} \tag{5}$$

$$Q_{n,p}(k) = U_{n,p} A_{n,p} \Delta T_{n,p}(k) \tag{6}$$

where the subscript n denotes the $n^{th}$ node, the subscript p denotes the $p^{th}$ surface 102 of the element 100, m is the mass of the discretized volume, $\Delta t$ is the time step, $A_{n,p}$ is the area of the $p^{th}$ surface 102, $\Delta T_{n,p}$ is the temperature difference between the element 100 and an adjacent element at the $p^{th}$ surface 102, and $U_{n,p}$ is the heat transfer coefficient at the $p^{th}$ surface 102. $Q_{n,p}$ may represent the heat transfer between the surface 102 of the element 100 and each corresponding surface of the adjacent elements. In some cases, the $\Delta T_{n,p}$ value may correspond to one of the cell boundary thermal conditions BC1 through BC6 (104-114). That is, in some cases, the difference may be between a boundary temperature, $T_{BC,p}$ and the node temperature $T_n$. In cases in which the boundary condition represents a perfectly insulated surface, the temperature difference may be zero. The change in temperature for each element 100 is based on the amount of heat generated in the cell caused by battery operation and an amount of heat transferred at each surface 102 shared with adjacent elements. The PDE can be expressed in state-space representation as follows:

$$T(k+1) = AT(k) + \Sigma_p B_{1,p} T_{BC,p}(k) + B_2 Q_{gen}(k) \tag{7}$$

where $T(k) = [T_1(k), T_2(k), \ldots, T_n(k), \ldots, T_N(k)]^T$, N is a total number of nodes (or elements) 100, A is a system matrix, $B_1$ is an input matrix for the cell boundary thermal conditions (104-114), and $B_2$ is an input matrix for heat generation in the cell. The $B_1$ matrix may consist of multiple columns, with each column, $B_{1,p}$, associated with one of the boundary conditions, $T_{BC,p}$ of the cell.

The system matrix, A, may be derived from equations (5) and (6). The temperature of each element 100 may affect the temperature of adjacent elements. The system matrix may describe the interactions between the nodes or elements 100. The system matrix may include coefficients that describe the temperature interaction between the nodes 100, and the coefficients may be determined based on equations (5) and (6).

Some of the elements 100 may be located such that one or more surfaces 102 of the element lie on a boundary of the cell 72. These elements 100 may include a term that is related to one or more of the boundary conditions and may be expressed as one or more coefficients in the $B_{1,p}$ matrix. The $B_{1,p}$ matrix may define the effect of the boundary temperatures on the element temperature. Finally, the effect of the heat generated by operating the cell 72 may appear as coefficients in the $B_2$ matrix. In this manner, the temperature of the cell boundaries enters into the model and may affect the temperature of elements that are not adjacent to the boundary.

The response of the dynamic thermal system includes a steady-state response and a transient response. The steady-state response may be determined by setting the temperature at the next time interval, T(k+1), equal to the temperature of the present time interval, T(k), in equation (7). The steady-state temperature may be derived as:

$$T_{ss} = -\Sigma_p(A-1)^{-1}B_{1,p}T_{BC,p} - (A-I)^{-1}B_2 Q_{gen} \tag{8}$$

where $T_{ss}$ is the steady-state temperature vector, p represents a $p^{th}$ boundary condition, and I is an identity matrix having the same dimensions as A. The steady-state temperature for a given set of boundary temperatures and heat generated may be calculated if (A–I) is non-singular.

Equation (8) may be rearranged as:

$$T_{ss} = -\Sigma_p \alpha_{n,1,p} T_{BC,p} + \alpha_{n,2} Q_{gen} \tag{9}$$

where $\alpha_{n,1,p}$ is the $n^{th}$ row of $-(A-I)^{-1}B_{1,p}$ and $\alpha_{n,2}$ is the $n^{th}$ row of $-(A-I)^{-1}B_2$.

The coefficient $\alpha_{n,1,p}$ may represent the contribution of the $p^{th}$ cell boundary condition to the steady-state temperature of the $n^{th}$ node. The coefficient $\alpha_{n,2}$ may represent the contribution of the heat generated in the cell to the steady-state temperature of the nodes. Knowing the boundary conditions and the amount of heat generated in the cell allows the steady-state temperature of each element or node to be calculated.

As the boundary conditions and amount of heat generated by the cell change, the steady-state temperature will change in response. The temperature of the nodes (i.e., temperature distribution in the cell) will respond according to the full-order system model of equation (7). Given enough computing resources, the system of equations defined by equation (7) may be executed for each time interval to define the temperature of each element 100. However, even a modest system may prove computationally challenging. For example, a system modeled by one hundred or more nodes would require one hundred or more states to be updated at each time interval. Such a model may cause the required computational resources to exceed the battery controller hardware capability.

To capture temperature dynamics as the input conditions changes, the contributions may be filtered. The transient dynamics may be modeled to account for steady-state responses and dynamic characteristics. A dynamic model may be derived to capture the transient response of temperature at a specific location of the cell. Maximum temperature, minimum temperature, and average temperature may provide useful information for a battery thermal management system. One of these temperatures may be defined as a characteristic temperature, $T_{ch}$, of the battery cell. The dynamic behavior of the characteristic temperature may be predicted by combining the pre-calculated steady-state temperature at a predetermined location in the battery cell and a dynamics model. Due to the high damping and slow dynamics of the thermal system, a first-order transfer function may be considered as a dynamics model to capture the transient response. The response may be modeled as:

$$T_{ch}(s) = \Sigma_p \frac{\alpha_{ch,1}}{\tau_{ch,1,p}s+1} T_{BC,p}(s) + \frac{\alpha_{ch,2}}{\tau_{ch,2}s+1} Q_{gen}(s) \tag{10}$$

where $\tau$ is the time constant of the first-order element. The response is not limited to a first-order filter and higher-order transfer functions may be used. The time constants may be selected to match the dynamic behavior of the full-order model of equation (7). An off-line simulation may be performed using the full-order model to identify the time constants. Execution time of the reduced order model is greatly reduced as the reduced order model of equation (10) has fewer states to calculate. Although fewer states are used to represent the thermal dynamics of a cell, the response of the model may closely match the response of the full-order model.

Each coefficient $\alpha_n$ may be calculated based on the full-order model (coefficients are same as equation (9)). In the case of no heat generation, the temperature across the cell converges to the boundary temperature (i.e., the model may be simplified by setting the coefficients $\alpha_{n,1}$ to one). The value of $\alpha_{n,2}$ may be computed based on $-(A-I)^{-1} B_2$ at any spatial location within the cell. The coefficients may be of a node that represents a particular temperature characteristic of the battery cell.

The particular temperature characteristic may be any or all of a maximum, minimum and average temperature of the cell. For example, a maximum temperature characteristic may be calculated by determining the node having the largest coefficient for the heat generation contribution. The maximum temperature node may be the node having the largest coefficient. Similarly, the node having the minimum temperature may be the node having the smallest coefficient. The reduced order model allows several temperature characteristics to be calculated and may provide information representing temperature distribution across the cell.

The time constants of the transfer functions may be identified from a step response of the full-order model. These time constants may be derived off-line via minimizing the transient response error between the reduced-order model results and the full-order model results. Once the time constants are identified, the values may be programmed into the embedded controller 76 for on-line temperature estimation.

Calculating the temperature of every node in the model may be computationally challenging for an embedded microprocessor. However, execution time may be reduced because only a few temperatures may be of interest in controlling the battery. The temperatures of interest may be a maximum cell temperature, a minimum cell temperature, and an average cell temperature. A range or distribution of temperatures may provide enough information to effectively control the battery. For example, the maximum cell temperature provides information regarding the highest temperature within the cell. A battery controller may attempt to prevent the battery from exceeding a predetermined maximum temperature value.

Figure 5:
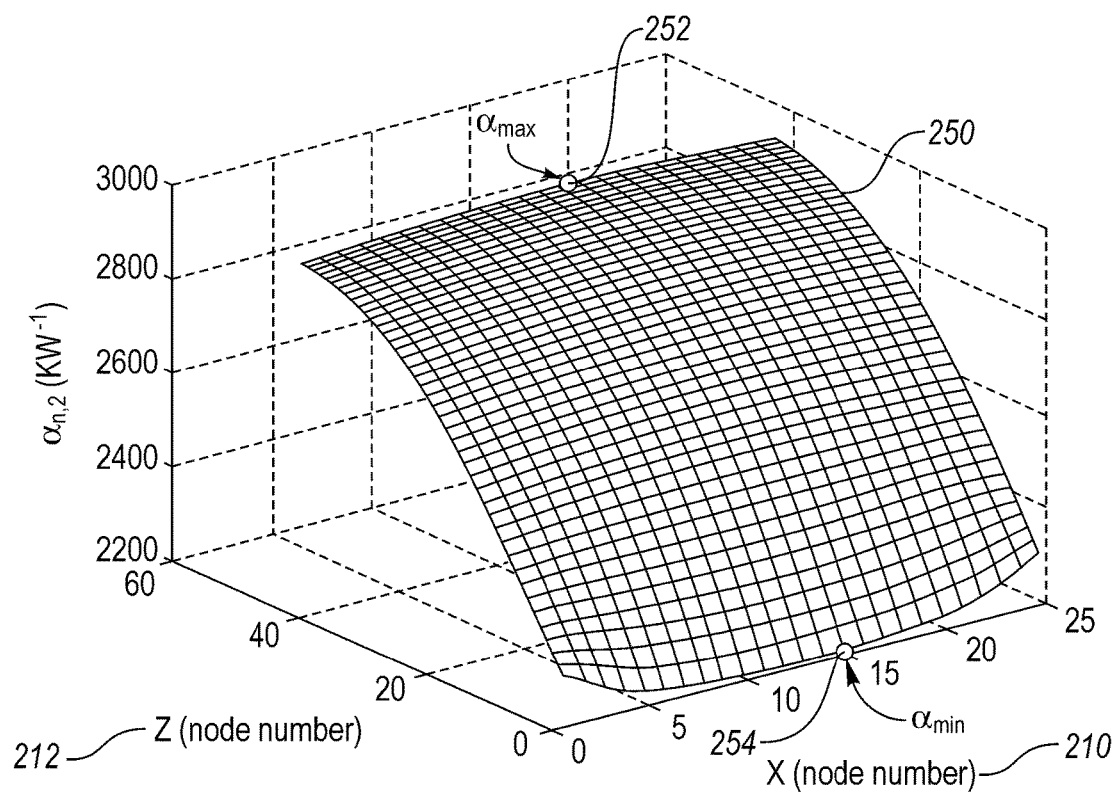
FIG. 5 is a graph of a coefficient representing the contribution of a heat generated by the cell to the temperature of each element.

Based on the transfer function of equation (10), the coefficient $\alpha_{ch,2}$ may be determined in advance since A and $B_2$ are known. The coefficients may be generated off-line and the appropriate coefficients may be selected for use in the embedded controller 76. A surface plot of the coefficient value with respect to the location of nodes representing the battery cell may be generated as shown in FIG. 5. In general, the maximum coefficient value may correspond to the node with the highest temperature. Likewise, the minimum coefficient value may correspond to the node with the lowest temperature. The desired coefficient may be selected and utilized in equation (10) to calculate the temperature of the desired node.

Figure 4:
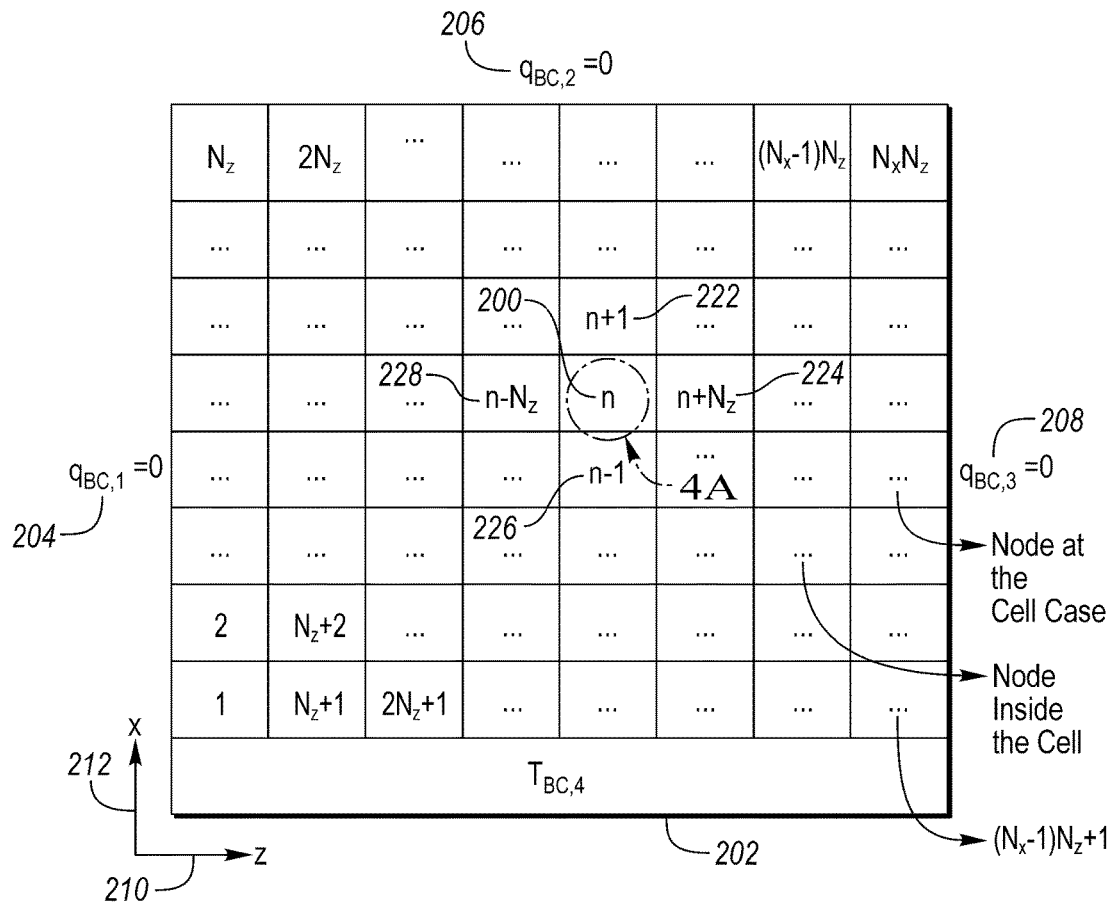
FIG. 4 depicts a two-dimensional example of dividing a battery cell into elements or nodes.

FIG. 4 depicts an example configuration for the selection of the nodes or elements. A cell may be divided into a number of elements in two-dimensions. Each element may be located at a particular position along an x-axis 210 and a z-axis 212. The $n^{th}$ node 200 may be represented as being acted upon by a heat transfer from adjacent nodes (222-226). Nodes located on the cell boundaries may be directly acted upon by the corresponding boundary condition (202-208). Nodes not located on the cell boundaries may be indirectly acted upon by the boundary conditions through interactions with adjacent nodes.

Around the boundaries of the cell, certain boundary conditions (202-208) may be present. For example, a cooling plate may contact a lower surface of the cell and coolant may flow adjacent the cooling plate to remove heat from the cell. The cell boundary may be characterized by a temperature ($T_{BC,4}$, 202) that is the temperature of the cooling plate. The boundary condition associated with the cooling plate (202) may be a temperature of the cooling plate.

Other cell boundaries may be insulated from the environment and provide no heat transfer ($q_{BC,1}$ 204, $q_{BC,2}$ 206, and $q_{BC,3}$ 208). That is, the temperature of the boundary may be the same as the adjacent node. The rate of heat transfer at a perfectly insulated boundary may be zero. The model is not limited to having perfectly insulated boundaries.

Figure 4A:
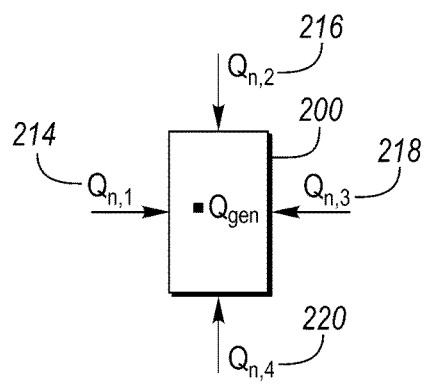
FIG. 4A depicts a representative element from a battery cell represented by a two-dimensional structure of elements or nodes.

FIG. 4A depicts the interactions of the $n^{th}$ node 200 with adjacent nodes. Each element of a two-dimensional model may have four thermal transfer terms as each element may be adjacent to up to four other elements. For example, the $n^{th}$ node 200 may interact with adjacent nodes n+1 222, n+$N_z$ 224, n−1 226, and n−$N_z$ 228. In a three-dimensional model, there may be six thermal transfer terms at each node. The rate of heat flow between node (n−$N_z$) 228 and the $n^{th}$ node 200 may be $Q_{n,1}$ 214. The rate of heat flow between node (n+1) 222 and the $n^{th}$ node 200 may be $Q_{n,2}$ 216. The rate of heat flow between node (n+N) 224 and the $n^{th}$ node 200 may be $Q_{n,3}$ 218. The rate of heat flow between node (n−1) 226 and the $n^{th}$ node 200 may be $Q_{n,4}$ 220. The system matrix and input matrices of the configuration of nodes may be constructed as described previously.

FIG. 5 depicts an example surface plot of one of the coefficients, $\alpha_{n,2}$, as derived for each node in an example two-dimensional configuration. Each node may be represented by the position of the node along the x-axis 210 and the z-axis 212. The coefficient values at each x-z coordinate may be plotted as a surface 250. The calculation of the coefficient values for each node may be performed off-line using the full-order model. Selected coefficient values for nodes of interest may be utilized in a real-time controller for calculating the cell temperatures. For example, a maximum coefficient value 252 may be selected as the coefficient having the maximum value of all the coefficients. A minimum coefficient value 254 may be selected as the coefficient having the minimum value of all of the coefficients. Coefficient values based on other criteria (e.g., average value of coefficients) may be selected. Note that the same analysis may be performed utilizing a three-dimensional node structure.

Figure 6:
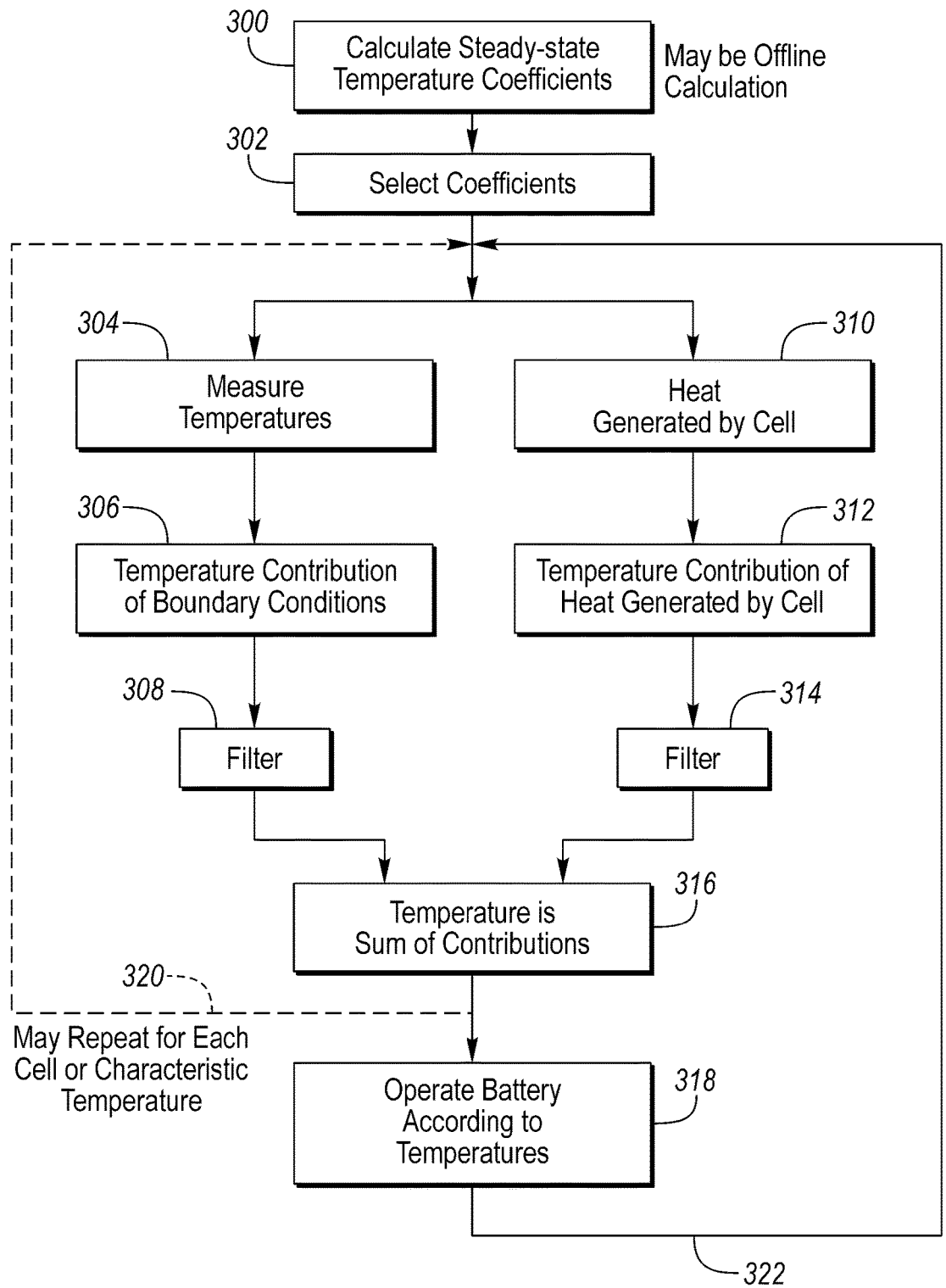
FIG. 6 is a flowchart of a possible set of steps for calculating a temperature of one of the elements representing a location within a battery cell.

FIG. 6 depicts a flow chart for one possible set of steps to implement the above logic. The operations in the flowchart may be implemented in one or more controllers. Operation 300 may be implemented in which the steady-state temperature coefficients are calculated. This calculation may be performed off-line and the results may be stored. Operation 302 may be implemented in which steady-state temperature coefficients are selected according to one or more characteristic temperatures that are desired. Note that operations may be performed sequentially or in parallel depending upon the controller. Some operations may be depicted in parallel but may be performed sequentially instead.

Operation 304 may be implemented in which temperatures associated with boundary temperatures may be measured. Operation 306 may be implemented in which the contribution to the steady-state temperature of the boundary conditions is calculated. Operation 308 may be implemented to filter the contribution to predict the dynamic response of the temperature as influenced by the boundary condition changes.

Operation 310 may be implemented in which the heat generated in the cell is calculated. The heat generated may be a function of the cell voltage and current as described by equation (2). The voltage and current may be measured. Operation 312 may be implemented in which the contribution of the heat generated in the cell to the steady-state temperature is calculated. Operation 314 may be implemented to filter the contribution to predict the dynamic response of the temperature as influenced by the heat generated in the cell.

Operation 316 may be implemented to sum the contribution due to the boundary conditions and the contribution due to the heat generated in the cell to arrive at the characteristic temperature of the cell. Path 320 may be implemented to repeat the temperature calculations for each cell or to calculate a different characteristic temperature for the cell.

Operation 318 may be implemented to operate the traction battery according to the characteristic temperatures. For example, maximum temperatures may be monitored to ensure that all temperatures are below a predetermined threshold. Path 322 may be implemented to continually repeat the process.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery including a plurality of cells; and
at least one controller programmed to operate the traction battery according to a temperature for each of the cells that is based on a plurality of coefficients representing a contribution of at least one cell boundary thermal condition and a heat generated in the cell to a steady-state temperature at a predetermined location within the cell, and filter the contribution of the at least one cell boundary thermal condition and the heat generated to predict a dynamic response to changes in the at least one cell boundary thermal condition and the heat generated.

2. The vehicle of claim 1 wherein the at least one controller is further programmed to filter the contribution of the at least one cell boundary thermal condition with a first time constant to predict a dynamic response to changes in the at least one cell boundary thermal condition and filter the contribution of the heat generated in the cell with a second time constant to predict a dynamic response to changes in the heat generated in the cell.

3. The vehicle of claim 1 wherein the coefficient associated with the contribution of the heat generated in the cell is derived from a model in which the cells are represented as a plurality of elements, and wherein the coefficient corresponding to each of the elements is derived from a system matrix defining interactions between the elements and an input matrix defining influence of the heat generated in the cell.

4. The vehicle of claim 3 wherein the predetermined location corresponds to the element in which the coefficient associated with the contribution caused by the heat generated in the cell is a maximum.

5. The vehicle of claim 3 wherein the predetermined location corresponds to the element in which the coefficient associated with the contribution caused by the heat generated in the cell is a minimum.

6. The vehicle of claim 1 wherein the at least one cell boundary condition includes a measured temperature.

7. The vehicle of claim 1 wherein the coefficients associated with the contribution of the at least one cell boundary thermal condition is derived from a model in which the cells are represented as a plurality of elements, and wherein the coefficients corresponding to each of the elements is derived from a system matrix defining interaction between the elements and an input matrix defining influence of the at least one cell boundary thermal condition.

8. The vehicle of claim 7 wherein the coefficients associated with the contribution of the at least one cell boundary thermal condition are set to a value of one.

9. A battery management system comprising:
at least one controller programmed to operate a battery cell according to a cell temperature that is based on a plurality of coefficients representing a contribution of at least one cell boundary condition and a heat generated in the battery cell to a steady-state temperature at a predetermined location within the battery cell and filter the contribution of the at least one cell boundary condition and the heat generated.

10. The battery management system of claim 9 wherein the at least one controller is further programmed to filter the contribution of the at least one cell boundary condition with a first time constant and filter the contribution of the heat generated in the cell with a second time constant.

11. The battery management system of claim 9 wherein the coefficients are derived from a system matrix that defines temperature interactions between a plurality of elements that represent the battery cell, a first input matrix defining influence of the at least one cell boundary condition, and a second input matrix defining influence of the heat generated in the battery cell.

12. The battery management system of claim 9 wherein a coefficient associated with the contribution of heat generated in the battery cell is a maximum value.

13. The battery management system of claim 9 wherein a coefficient associated with the contribution of heat generated in the battery cell is a minimum value.

14. A method of operating a traction battery including a plurality of cells, the method comprising:
    outputting, by a controller, a temperature for each of the cells that is based on a plurality of coefficients, derived from a cell model as represented by a plurality of elements, representing a contribution of at least one cell boundary condition and a heat generated in the cell to a steady-state temperature of a predetermined location, corresponding to a selected one or more of the elements, within the cell; and
    operating the traction battery according to the temperature of the cells.

15. The method of claim 14 further comprising filtering, by the controller, the contribution of the at least one cell boundary condition using a filter with a first time constant and the heat generated in the cell using a filter with a second time constant to filter changes in the steady-state temperature.

16. The method of claim 14 wherein the predetermined location corresponds to the element in which the coefficient associated with the contribution caused by the heat generated in the cell is a maximum.

17. The method of claim 14 wherein the predetermined location corresponds to the element in which the coefficient associated with the contribution caused by the heat generated in the cell is a minimum.

* * * * *